(12) United States Patent
Williams

(10) Patent No.: US 7,979,970 B2
(45) Date of Patent: Jul. 19, 2011

(54) APPARATUS AND METHOD FOR REPAIRING OUT-OF-ROUND TUBULAR CORES, AND TUBULAR CORE AND COILED STRAPPING ASSEMBLIES

(75) Inventor: James Patrick Williams, Langley (CA)

(73) Assignee: Illinois Tool Works Inc., Glenview, IL (US)

( * ) Notice: Subject to any disclaimer, the term of this patent is extended or adjusted under 35 U.S.C. 154(b) by 1365 days.

(21) Appl. No.: 11/482,937

(22) Filed: Jul. 10, 2006

(65) Prior Publication Data

US 2008/0005880 A1 Jan. 10, 2008

(51) Int. Cl.
*B23P 6/00* (2006.01)
*B22D 19/10* (2006.01)
*B23K 9/04* (2006.01)
*B21D 1/00* (2006.01)
*B21D 3/16* (2006.01)

(52) U.S. Cl. ........... 29/402.19; 29/402.17; 29/402.18

(58) Field of Classification Search .. 29/402.17–402.19, 29/402.01, 402.09; 72/393, 296, 466; 269/48.1
See application file for complete search history.

(56) References Cited

U.S. PATENT DOCUMENTS

| | | | | |
|---|---|---|---|---|
| 3,855,838 A * | 12/1974 | Jackson | ........................ | 72/389.9 |
| 4,569,219 A * | 2/1986 | Threlkel et al. | ................. | 72/381 |
| 4,829,806 A * | 5/1989 | Wright | ............................. | 72/459 |
| 5,237,847 A * | 8/1993 | Owens | ............................ | 72/213 |
| 5,615,572 A * | 4/1997 | Johnson et al. | ............... | 72/389.1 |
| 6,487,889 B1 * | 12/2002 | Bates et al. | ...................... | 72/459 |
| 6,931,908 B1 * | 8/2005 | Mitson | ......................... | 72/390.2 |
| 7,000,447 B1 * | 2/2006 | Burkhart | ....................... | 72/390.6 |
| 2003/0205074 A1 * | 11/2003 | O'Donnell et al. | ............. | 72/155 |
| 2004/0182129 A1 * | 9/2004 | Hopwood | ........................ | 72/459 |
| 2004/0258789 A1 * | 12/2004 | Phillips et al. | ................. | 425/384 |
| 2005/0121834 A1 * | 6/2005 | Ezure et al. | .................... | 264/449 |
| 2005/0208169 A1 * | 9/2005 | Johnson | ......................... | 425/393 |
| 2005/0257593 A1 * | 11/2005 | Bates et al. | ..................... | 72/458 |

* cited by examiner

*Primary Examiner* — A. Dexter Tugbang
*Assistant Examiner* — David P Angwin
(74) *Attorney, Agent, or Firm* — Law Offices of Steven W. Weinrieb

(57) ABSTRACT

Apparatus for repairing out-of-round cores, upon which strapping material has been coiled, when the core and coiled strapping material assembly has been deformed and is therefore no longer capable of being mounted upon strapping unwinding and dispensing apparatus. The repair apparatus comprises a pair of diametrically opposed, substantially semi-circular shoes which are mounted upon a pair of diametrically aligned rod members that are operatively connected together by means of a diametrically oriented expansion member. The apparatus is adapted to be disposed internally within the deformed core and coiled strapping material assembly, and when the expansion member is diametrically extended, the pair of semi-circular shoes will be forced into contact with the inner periphery of the deformed core and coiled strapping material assembly thereby returning the same to a truly round configuration.

20 Claims, 11 Drawing Sheets

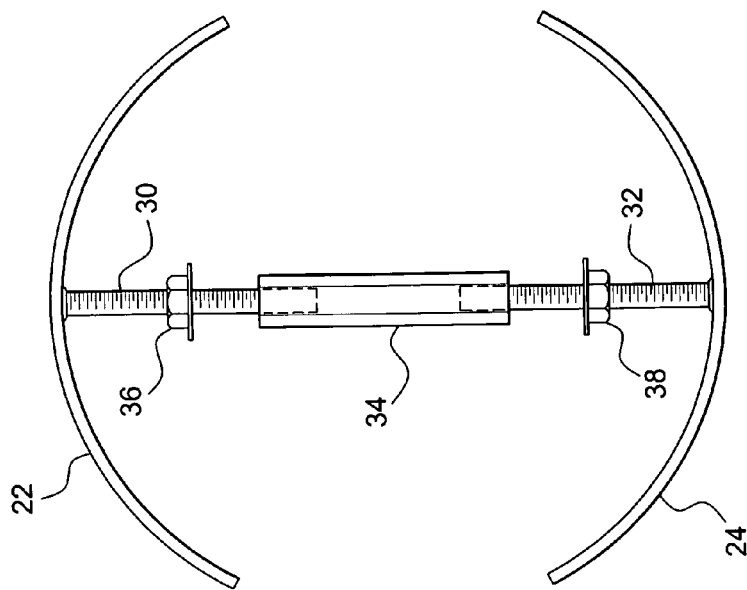
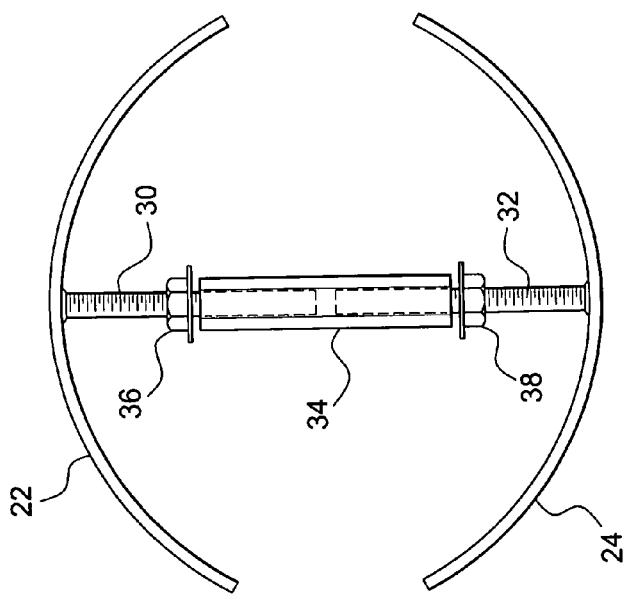

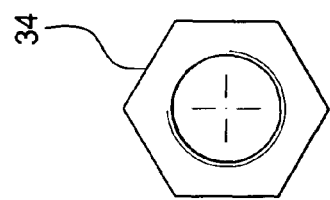
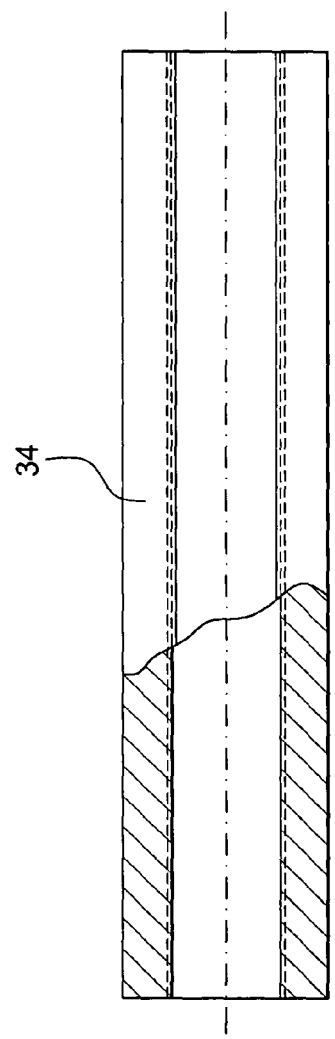

APPARATUS AND METHOD FOR REPAIRING OUT-OF-ROUND TUBULAR CORES, AND TUBULAR CORE AND COILED STRAPPING ASSEMBLIES

FIELD OF THE INVENTION

The present invention relates generally to repair apparatus, and more particularly to a new and improved apparatus for repairing out-of-round tubular cores, upon which steel or thermoplastic strapping material have been coiled, wherein the tubular cores, and the tubular core and coiled strapping material assemblies, have been deformed, for example, during shipping or handling, whereby the deformed, out-of-round tubular cores, or the deformed, out-of-round tubular core and coiled strapping material assemblies, are no longer capable of being mounted, for example, upon coiled strapping unwinding or dispensing systems which comprise, for example, rotary mounting structure upon which only substantially truly round or circular tubular cores, and substantially truly round or circular tubular core and coiled strapping material assemblies, can be mounted so as to achieve coiled strapping unwinding or dispensing operations, the present invention apparatus therefore being adapted to being disposed internally within a deformed tubular core, and within a deformed tubular core and coiled strapping material assembly, so as to operatively engage the inner periphery of the deformed tubular core, and the inner periphery of the deformed tubular core and coiled strapping material assembly, so as to restore the deformed tubular core, and the deformed tubular core and coiled strapping material assembly, to truly round or circular configurations.

BACKGROUND OF THE INVENTION

Steel and thermoplastic strapping materials are conventionally disposed in coiled form upon tubular cardboard or steel cores whereby the tubular core and coiled strapping material assemblies can then be disposed upon rotary apparatus for unwinding or dispensing the coiled strapping material during, for example, article or package strapping operations. Occasionally, the tubular core and coiled strapping material assemblies are subjected to forces during, for example, shipping or handling, whereby the tubular cores, and therefore the entire tubular core and coiled strapping material assemblies, become deformed, that is, the tubular cores, and the tubular core and coiled strapping material assemblies are no longer truly round or circular but, to the contrary, may have, for example, elliptical or substantially oval-shaped configurations defined by means of relatively large diametrical extents disposed within, for example, horizontally oriented planes, and relatively small diametrical extents disposed within, for example, vertically oriented planes. Accordingly, such deformed tubular cores, and the deformed tubular core and coiled strapping material assemblies, are no longer capable of being mounted upon rotary coiled strapping material unwinding or dispensing apparatus whereby the deformed tubular cores, and the deformed tubular core and coiled strapping material assemblies, need to be discarded and scrapped. Obviously, such modes of operation are economically undesirable in that they entail a substantial waste of fabricated materials, lost manufacturing or production time, and the like.

A need therefore exists in the art for a new and improved apparatus for repairing deformed tubular cores, and deformed tubular core and coiled strapping material assemblies, so as to enable the deformed tubular cores, and the deformed tubular core and coiled strapping material assemblies, to effectively regain their truly round or circular configurations in order to enable the repaired tubular cores, and the repaired tubular core and coiled strapping material assemblies, to again be capable of being mounted upon the rotary apparatus to be used to unwind or dispense the coiled strapping material therefrom.

SUMMARY OF THE INVENTION

The foregoing and other objectives are achieved in accordance with the teachings and principles of the present invention through the provision of a new and improved apparatus for repairing out-of-round tubular cores, upon which steel or thermoplastic strapping material have been coiled, wherein the tubular core and coiled strapping material assemblies may have been subjected to forces, such as, for example, during shipping or handling, whereby the tubular cores, and the tubular core and coiled strapping material assemblies, may have been deformed such that the out-of-round tubular cores, and the out-of-round tubular core and coiled strapping material assemblies, are no longer capable of being mounted, for example, upon strapping unwinding or dispensing systems which comprise, for example, rotary mounting structure upon which only substantially truly round tubular cores, and truly round tubular core and coiled strapping material assemblies, can be mounted so as to achieve strapping unwinding or dispensing operations. The apparatus of the present invention comprises a pair of diametrically opposed, substantially semi-circular shoes which are mounted upon a pair of diametrically aligned rod members, and a diametrically oriented expandible or extendible member upon the opposite ends of which the pair of diametrically aligned rod members are operatively mounted so as to thereby be operatively connected together through means of the expandible or extendible member.

Accordingly, when the apparatus is disposed internally within a deformed tubular core, or within a deformed tubular core and coiled strapping material assembly, and when the diametrically oriented expandible or extendible member is actuated so as to cause the pair of diametrically aligned rod members to be diametrically expanded or extended with respect to each other, the pair of diametrically opposed, substantially semi-circular shoes will be forced into contact with the inner periphery of the deformed core, or into contact with inner peripheral wall portions of the deformed tubular core and coiled strapping material assembly, so as to thereby forcefully cause the deformed tubular core, or the deformed tubular core and coiled strapping material assembly, to be returned to a truly round or circular configuration whereby the repaired tubular core, or the repaired tubular core and coiled strapping material assembly, is able to be mounted upon the rotary apparatus for unwinding or dispensing the coiled strapping material therefrom. The apparatus may comprise mechanical, pneumatic, or hydraulic expandible or extendible means for moving the pair of diametrically opposed, substantially semi-circular shoes to their extended positions into engagement with the inner peripheral wall portions of the tubular core or into engagement with the inner peripheral wall portions of the tubular core and coiled strapping material assembly.

BRIEF DESCRIPTION OF THE DRAWINGS

Various other features and attendant advantages of the present invention will be more fully appreciated from the following detailed description when considered in connection with the accompanying drawings in which like reference characters designate like or corresponding parts throughout the several views, and wherein:

FIG. 5 is a side elevational view, partly in cross-section, of the first embodiment expandable or extendible apparatus, as disclosed within FIG. 2, wherein the first embodiment expandible or extendible apparatus is disclosed at its contracted or retracted state;

FIG. 6 is a side elevational view, partly in cross-section, of the first embodiment expandable or extendible apparatus, as disclosed within FIG. 5, wherein the first embodiment expandible or extendible apparatus is disclosed at its expanded or extended state;

FIG. 9 is an enlarged detailed view of the elongated, hexagonally shaped nut or turnbuckle-type member which is adapted to be threadedly engaged with the right-handed and left-handed threaded screw rod members of the first embodiment expandable or extendible apparatus as disclosed within FIGS. 7 and 8;

FIG. 10 is an end elevational view of the elongated, hexagonally shaped nut or turnbuckle-type member as disclosed within FIG. 9;

DETAILED DESCRIPTION OF THE PREFERRED EMBODIMENT

Figure 1:
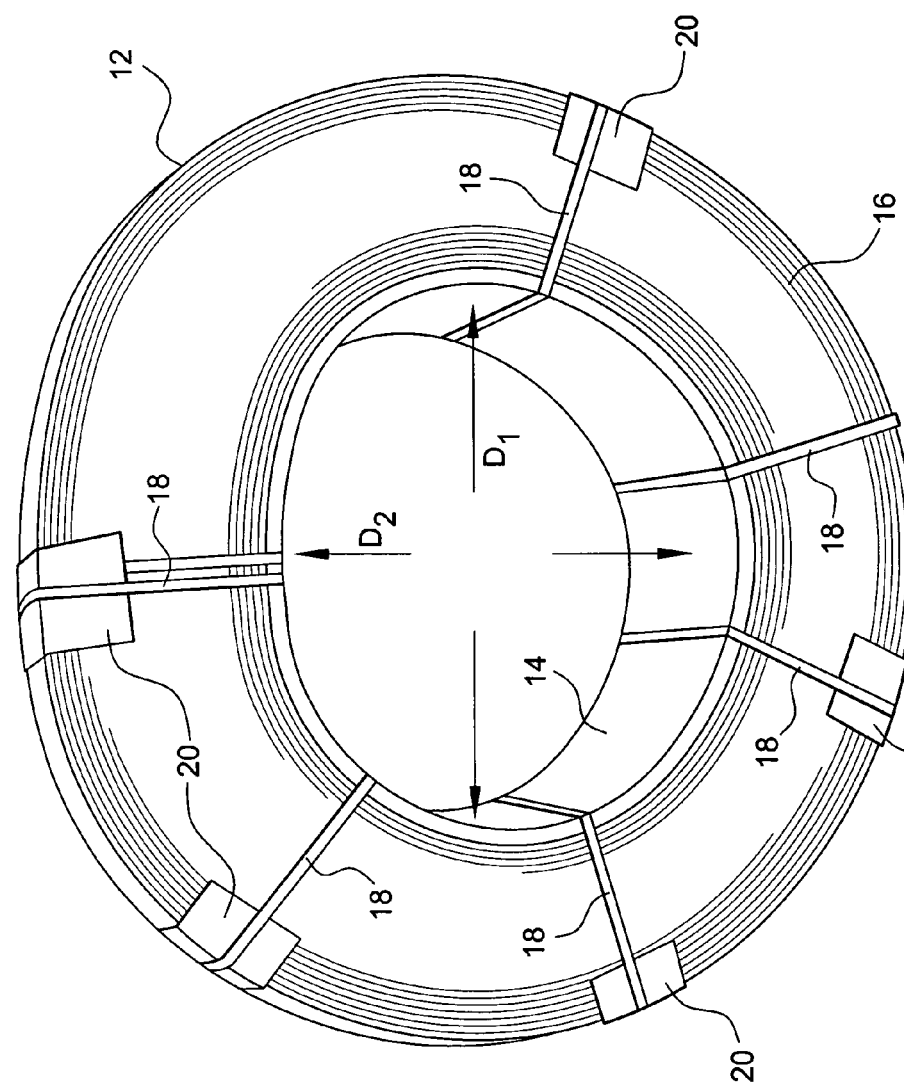
FIG. 1 is a perspective view of a deformed tubular core and coiled strapping material assembly, wherein the tubular core, and the tubular core and coiled strapping material assembly have, for example, substantially elliptical or oval-shaped configurations which need to be repaired in order to reshape the deformed tubular core, and the deformed tubular core and coiled strapping material assembly, so as to effectively restore the configuration of the tubular core, and the configuration of the tubular core and coiled strapping material assembly, to a truly round or circular configuration whereby the tubular core, and the tubular core and coiled strapping material assembly, can be mounted upon rotary apparatus which is utilized in connection with the unwinding or dispensing of the coiled strapping material from the tubular core and coiled strapping material assembly.
Figure 2:
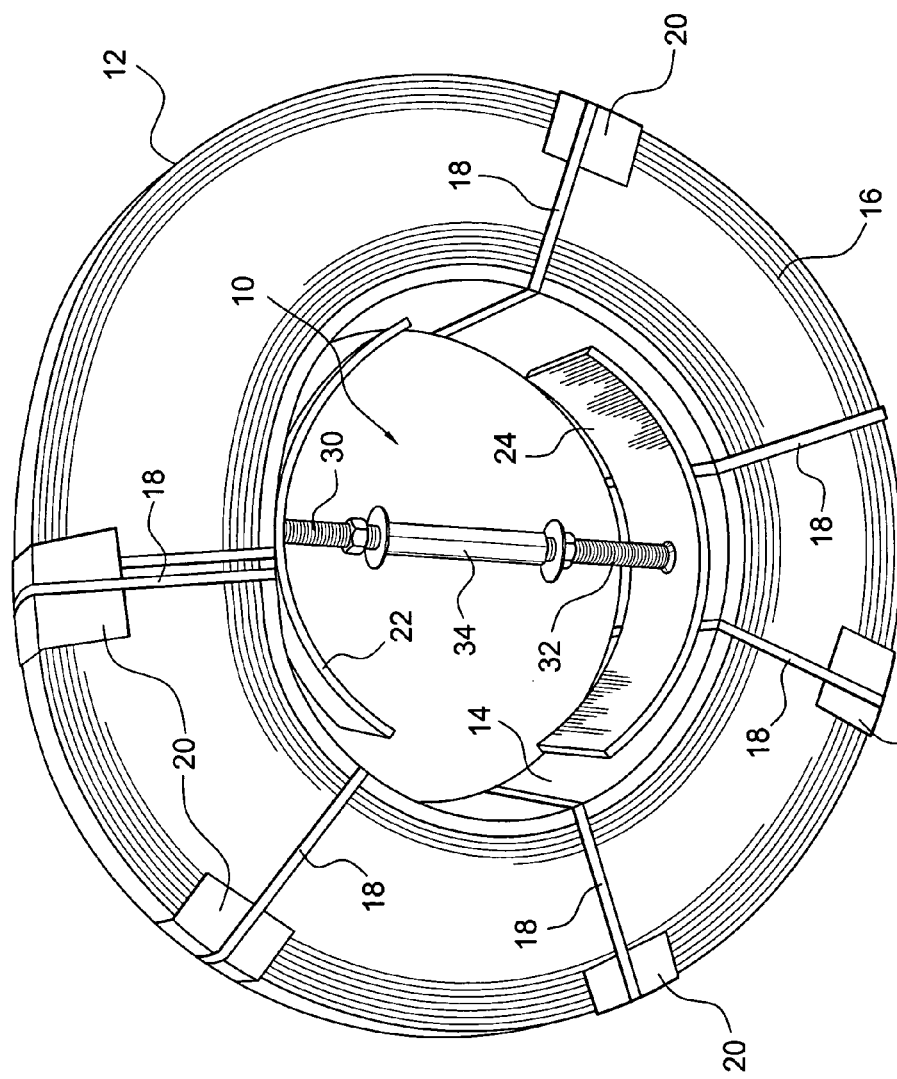
FIG. 2 is a perspective view, similar to that of FIG. 1, showing a first embodiment of an extendible or expandable apparatus, constructed in accordance with the principles and teachings of the present invention, and disposed internally within the deformed tubular core and coiled strapping material assembly of FIG. 1, at its retracted or contracted state, so that when the first embodiment apparatus is activated to its extended or expanded state, the deformed tubular core, and the deformed tubular core and coiled strapping material assembly, will be repaired and restored to their truly round or circular configurations.

Referring now to the drawings, and more particularly to FIGS. 1-10 thereof, a first embodiment of a new and improved apparatus, constructed in accordance with the principles and teachings of the present invention for repairing deformed tubular cores upon which coiled strapping material is to be wound and stored in preparation for an unwinding or dispensing operation, or for repairing deformed tubular core and coiled strapping material assemblies so as to enable such repaired tubular core and coiled strapping material assemblies to be operatively mounted upon strapping unwinding or dispensing apparatus, is disclosed and is generally indicated by the reference character 10. More particularly, as can best be firstly appreciated from FIG. 1, it is initially seen that a typical tubular core and coiled strapping material assembly 12 comprises a tubular core member 14, which may be fabricated from a suitable laminated cardboard material having a thickness dimension of, for example, one half of an inch (0.500"), or from a suitable steel material having a thickness dimension of, for example, one eighth of an inch (0.125"), and a coiled, circumferential array of thermoplastic or steel strapping material 16 which is wound around the outer peripheral surface portion of the core member 14. The coiled array of strapping material 16 is maintained in its secured state upon the outer peripheral surface portion of the core member 14 by means of a plurality of circumferentially spaced band members 18 which extend across circumferentially spaced regions of the inner peripheral surface portion of the core member 14, across circumferentially spaced regions of the oppositely disposed side wall portions of the coiled array of strapping material 16, and across circumferentially spaced regions of the outer peripheral surface portion of the coiled array of strapping material 16. In addition, a plurality of suitable U-shaped protectors 20 are preferably respectively interposed between each one of the plurality of band members 18 and the outer peripheral surface portions of the coiled array of the strapping material 16, across which the plurality of band members 18 extend, so as to effectively protect the outer peripheral surface portions of the coiled array of strapping material 16 against any damage that may be inflicted or impressed thereon as a result of tightening operations performed in connection with the securing of the plurality of band members 18 upon the tubular core and coiled strapping material assembly 12.

Continuing further, it is also to be appreciated that while the original tubular core member 14 is fabricated so as to exhibit a substantially round or circular configuration, it often happens that while, for example, the tubular core and coiled strapping material assembly 12 is being shipped or handled, the tubular core and coiled strapping material assembly 12 may be subjected to various forces which may result in the tubular core and coiled strapping material assembly 12 being damaged whereby, in particular, the tubular core member 14 will effectively be deformed so as to no longer have a substantially round or circular configuration defined by means of, for example, a diametrical extent of sixteen inches (16.00"), but, to the contrary, will in fact exhibit a substantially elliptical or oval-shaped configuration defined, for example, by means of a relatively large, horizontally oriented diametrical extent or dimension $D_1$, which may be, for example, eighteen inches (18.00"), and a relatively small, vertically oriented diametrical extent or dimension $D_2$, which may be, for example, fourteen inches (14.00"). These tubular core members 14, and the overall tubular core and coiled strapping material assemblies 12, having such a fore noted out-of-round elliptical or oval-shaped configurations are not desirable, however, in view of the fact that such deformed, or out-of-round, tubular core and coiled strapping material assemblies 12 are unable to be mounted upon the rotary structure or apparatus or structure which will be used to effectuate the unwinding or dispensing of the strapping material 16 from the tubular core and coiled strapping material assemblies 12.

Therefore, the first embodiment of the new and improved apparatus 10 has been constructed in accordance with the principles and teachings of the present invention for repairing such deformed tubular core and coiled strapping material assemblies 12, comprising the tubular cores 14 and the strapping material 16 coiled thereon, by effectively returning each one of the deformed tubular core and coiled strapping material assemblies 12, comprising the tubular cores 14 and the strapping material 16 coiled thereon, to their original substantially round or circular configuration. More particularly, with reference being made to FIGS. 2,3,5-10, it is seen that the first embodiment of the new and improved apparatus 10 of the present invention comprises a pair of diametrically opposed, arcuately configured, upper and lower shoes or plates 22,24, wherein each one of the diametrically opposed, arcuately configured, upper and lower plates or shoes 22,24 has an internal peripheral surface portion thereof respectively fixedly secured, such as, for example, by means of a suitable annular weldment 26,28, to a radially outer end portion of one of a pair of diametrically oriented and aligned, externally threaded upper and lower bars or rods 30,32. The pair of diametrically oriented and aligned, externally threaded upper and lower bars or rods 30,32 are oppositely threaded, that is, for example, the upper threaded bar or rod 30 has a right-handed thread formed or incorporated thereon, while the lower threaded bar or rod 32 has a left-handed thread formed or incorporated thereon. It is noted that each one of the pair of diametrically opposed, arcuately configured, upper and lower shoes or plates 22,24 is characterized by means of an eight inch (8.00") radius or radial dimension $R_1$, $R_2$, and has an arcuate or angular extent A of approximately 120°, as respectively disclosed within FIGS. 7 and 8, and that each one of the pair of diametrically oriented and aligned, externally threaded upper and lower bars or rods 30,32 has an axial length dimension $L_1$,$L_2$ as is also respectively disclosed within FIGS. 7 and 8.

In addition, an elongated hexagonal nut member 34, having an axial length dimension of, for example, six inches (6.00"), and opposite, that is, right-handed, and left-handed, threaded portions formed upon opposite internal end portions thereof, is adapted to be threadedly mated with and mounted upon radially inner portions of the pair of oppositely threaded, diametrically oriented and aligned bars or rods 30,32 such that the pair of oppositely threaded, diametrically oriented and aligned bars or rods 30,32, and the elongated hexagonal nut member 34 together form a turnbuckle assembly. Accordingly, as can best be appreciated from FIGS. 5 and 6, when the elongated hexagonal nut member 34 is rotated in either one of two opposite directions, that is, either in a clockwise direction, or in a counterclockwise direction, the pair of oppositely threaded, diametrically oriented and aligned bars or rods 30,32 will, in effect, be moved toward or away from each other so as to, in turn, move the pair of diametrically opposed, arcuately configured, upper and lower plates or shoes 22,24 toward or away from each other. In this manner, as is respectively disclosed within FIGS. 5 and 6, the pair of diametrically opposed, arcuately configured, upper and lower plates or shoes 22,24 can be disposed at CONTRACTED or EXTENDED states or positions with respect to each other. It is lastly seen that the pair of oppositely threaded, diametrically oriented and aligned bars or rods 30,32 are also respectively provided with nut and washer assemblies 36, 38 which effectively serve as stop members for limiting the radially inner travel of the oppositely threaded, diametrically oriented and aligned bars or rods 30,32 with respect to each other as they, and the pair of diametrically opposed, arcuately configured, upper and lower plates or shoes 22,24 fixedly attached thereto, are moved from their EXTENDED positions to their CONTRACTED positions.

In light of the foregoing disclosure and description of the various structural components of the first embodiment of the new and improved apparatus 10 of the present invention, the operation of the first embodiment of the new and improved apparatus 10 of the present invention will now be described. More particularly, in order to repair a damaged or deformed, out-of-round tubular core and coiled strapping material assembly 12 as disclosed, for example, within FIG. 1, the elongated hexagonal nut member 34 is initially rotated in the appropriate clockwise or counterclockwise direction so as to correspondingly move the pair of oppositely threaded, diametrically oriented and aligned bars or rods 30,32 toward each other so as to, in turn, move the pair of diametrically opposed, arcuately configured, upper and lower plates or shoes 22,24 toward each other and to their CONTRACTED states or positions as disclosed, for example, within FIG. 5. Accordingly, the new and improved first embodiment apparatus 10 of the present invention is then able to be disposed internally within the damaged or deformed core member 14 of the tubular core and coiled strapping material assembly 12 as disclosed within FIG. 2.

Subsequently, the elongated hexagonal nut member 34 is then rotated in the opposite clockwise or counterclockwise direction so as to in fact correspondingly move the pair of oppositely threaded, diametrically oriented and aligned bars or rods 30,32 away from each other so as to, in turn, move the pair of diametrically opposed, arcuately configured, upper and lower shoes or plates 22,24 away from each other and into contact with the inner peripheral portions of the damaged or deformed core member 14 of the tubular core and coiled strapping material assembly 12. At this point in time it will be noted that only the central portions of the upper and lower shoes or plates 22,24 are disposed in contact with the inner peripheral surface portions of the damaged or deformed core member 14 while the free or distal end or edge portions of the pair of diametrically opposed, arcuately configured, upper and lower shoes or plates 22,24 are spaced radially inwardly away from inner peripheral surface portions of the damaged or deformed core member 14 of the tubular core and coiled strapping material assembly 12 in view of the fact that those inner peripheral surface portions of the damaged or deformed core member 14 of the tubular core and coiled strapping material assembly 12 are characterized by means of relatively larger radius dimensions than those of the pair of diametrically opposed, arcuately configured, upper and lower shoes or plates 22,24.

Figure 3:
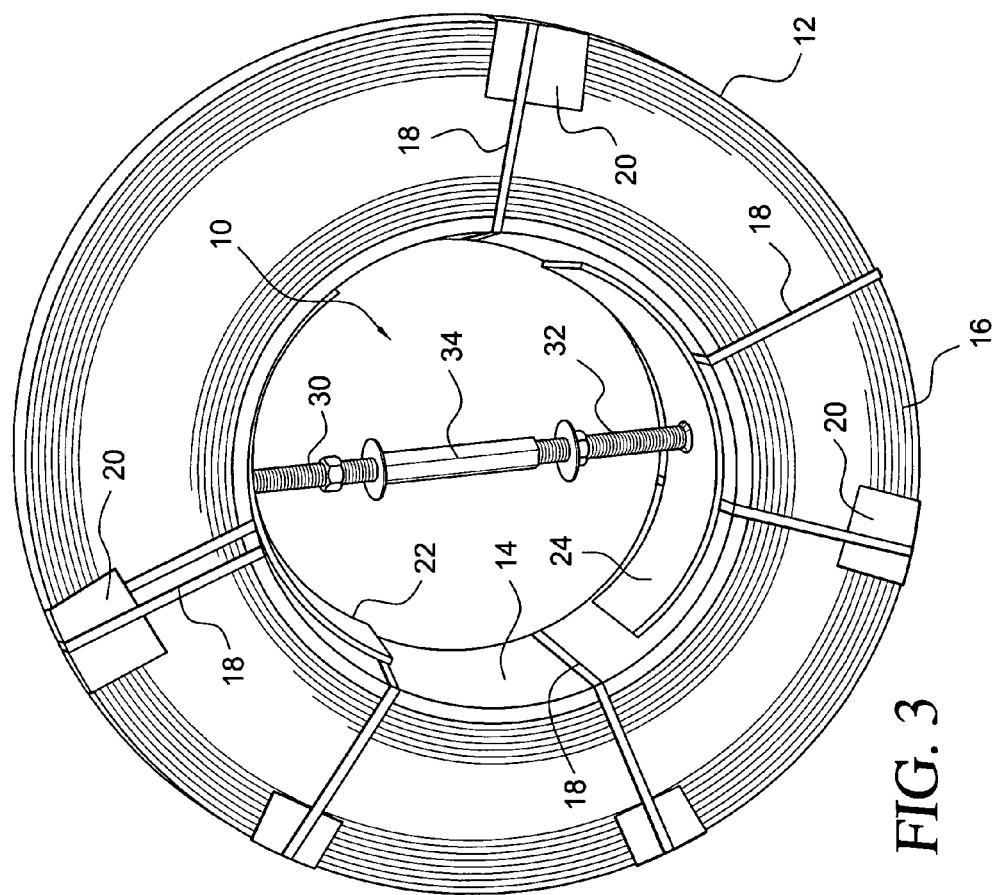
FIG. 3 is a perspective view, similar to that of FIG. 2, showing, however, the first embodiment expandable or extendible apparatus disposed at its expanded or extended state whereby the deformed tubular core, and the deformed tubular core and coiled strapping material assembly, as originally disclosed within FIG. 2, have now been repaired and restored to their truly round or circular configurations.
Figure 4:
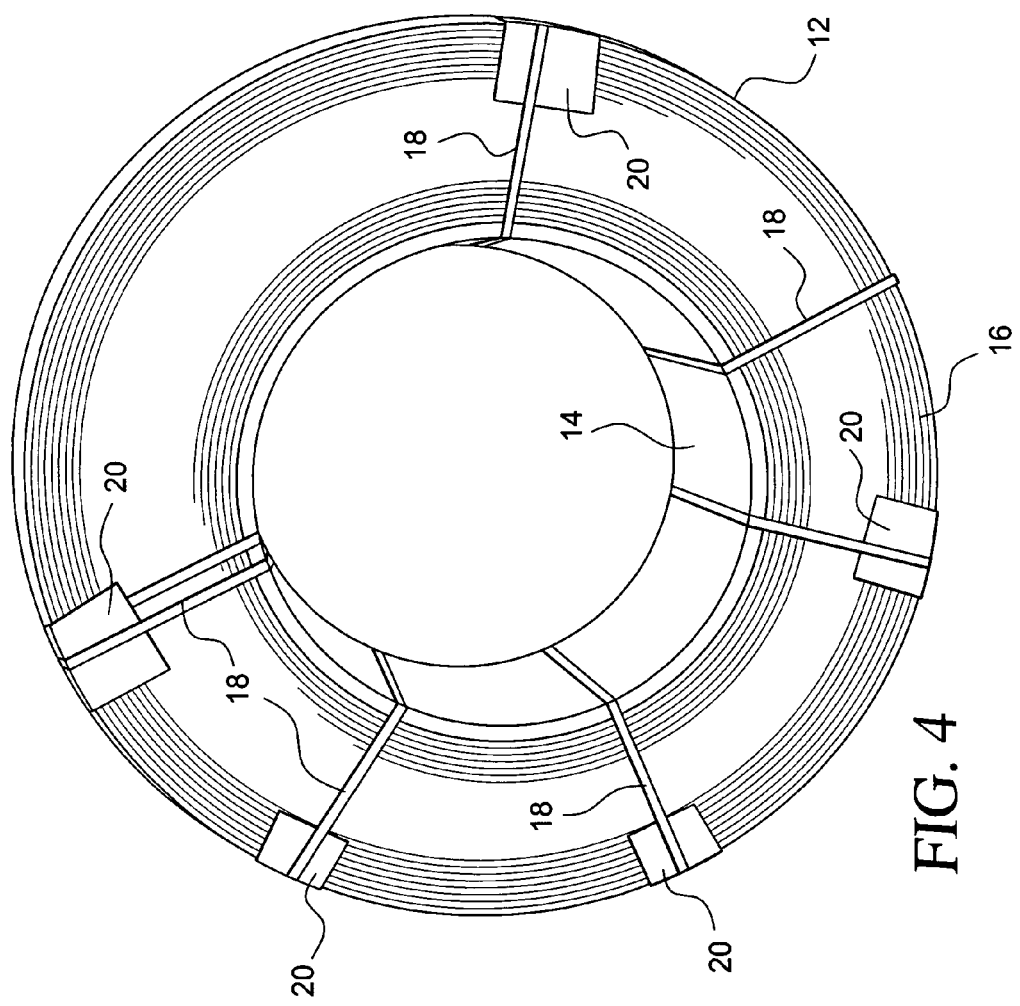
FIG. 4 is a perspective view, similar to that of FIG. 3, showing, however, the repaired tubular core, and the repaired tubular core and coiled strapping material assembly, after the first embodiment expandable or extendible apparatus has been removed from its operative position internally within the repaired tubular core and coiled strapping material assembly, thereby leaving the repaired tubular core and coiled strapping material assembly with its truly round or circular configuration.
Figure 7:
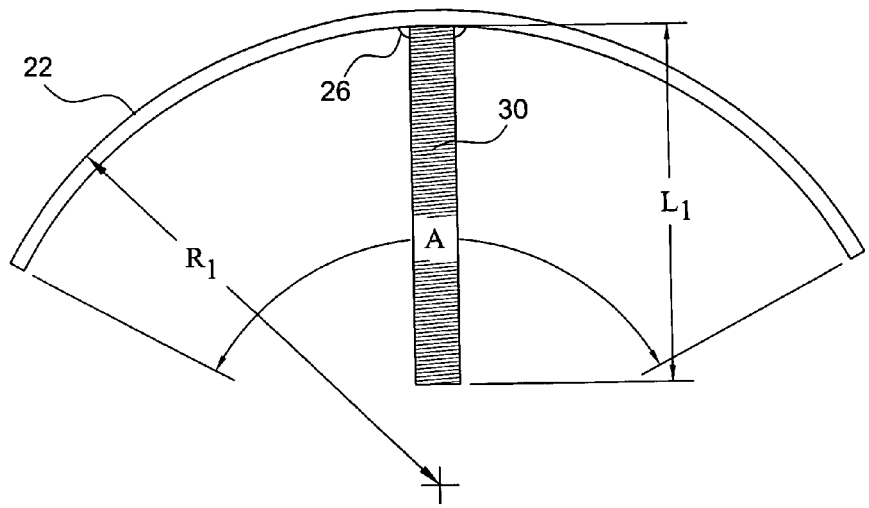
FIG. 7 is an enlarged detailed view of the upper semicircular shoe member, and of the right-handed threaded screw rod member integrally connected thereto, of the first embodiment expandable or extendible apparatus as disclosed within FIGS. 5 and 6.
Figure 8:
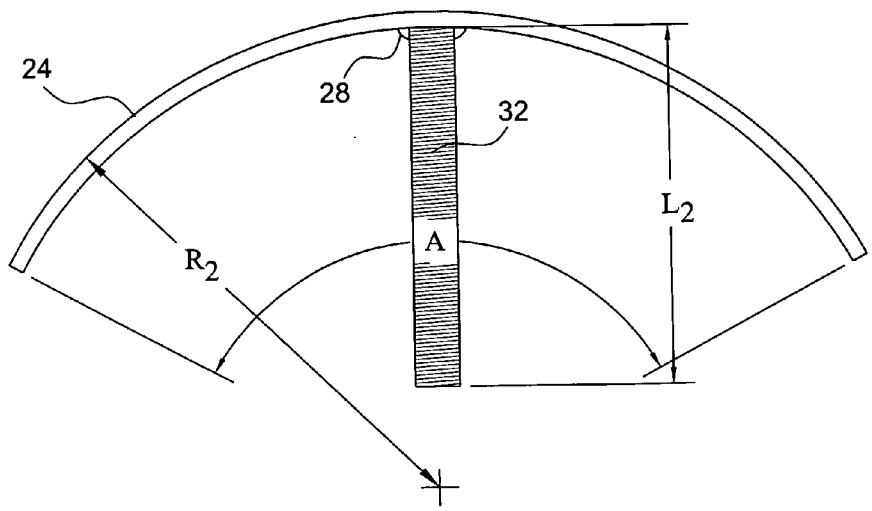
FIG. 8 is an enlarged detailed view of the lower semicircular shoe member, and of the left-handed threaded screw rod member integrally connected thereto, of the first embodiment expandable or extendible apparatus as disclosed within FIGS. 5 and 6.

Subsequently still further, the rotation of the elongated hexagonal nut member 34 is continued in the noted direction so as to continue to move the pair of oppositely threaded, diametrically oriented and aligned bars or rods 30,32 still further away from each other so as to, in turn, correspondingly move the pair of diametrically opposed, arcuately configured, upper and lower shoes or plates 22,24 still further away from each other until the entire arcuate extents of the pair of diametrically opposed, arcuately configured, upper and lower shoes or plates 22,24 are disposed at their fully EXTENDED positions, as illustrated within FIG. 6, so as to be disposed in contact with the inner peripheral portions of the core member 14 of the tubular core and coiled strapping material assembly 12 as disclosed within FIG. 3. Accordingly, at this point in time, it can be appreciated that the tubular core member 14, and the tubular core and coiled strapping material assembly 12, have effectively been restored to their original round or circular configurations, whereupon the elongated hexagonal nut member 34 can then be rotated in the opposite direction so as to move the pair of oppositely threaded, diametrically oriented and aligned bars or rods 30,32 back toward each other so as to, in turn, correspondingly move the pair of diametrically opposed, arcuately configured, upper and lower shoes or plates 22,24 back toward each other to their fully RETRACTED positions as disclosed within FIG. 5. The new and improved first embodiment apparatus 10 of the present invention can then be removed from the repaired or restored tubular core and coiled strapping material assembly 12 whereby the repaired or restored tubular core and coiled strapping material assembly 12, as disclosed within FIG. 4, can now be mounted upon the rotary strapping material unwinding or dispensing apparatus.

With reference now being made to FIGS. 11-14, a second embodiment of a new and improved of the new and improved apparatus has also been constructed in accordance with the principles and teachings of the present invention for repairing such deformed tubular core and coiled strapping material assemblies, comprising the tubular cores and the strapping material coiled thereon, and for effectively returning such deformed tubular core and coiled strapping material assemblies, comprising the tubular cores and the strapping material coiled thereon, to their original substantially round or circular configuration, and the same is disclosed and generally indicated by the reference character 110. It is noted that the various structural components comprising the second embodiment apparatus 110, for repairing such deformed tubular core and coiled strapping material assemblies, comprising the tubular cores and the strapping materials coiled thereon, are similar to the structural components comprising the first embodiment apparatus 10, and therefore, such structural components comprising the second embodiment apparatus 110, and corresponding to the similar structural components comprising the first embodiment apparatus 10, will be designated by similar reference characters, except that they will be within the 100 series. Still yet further, it is also noted that the detailed discussion of the second embodiment apparatus 110 will focus upon, or be substantially directed toward, the structural components comprising the second embodiment apparatus 110 and the differences of such structural components as compared to the various structural components comprising the first embodiment apparatus 10.

More particularly, the only significant difference between the first and second embodiment apparatus 10,110 of the present invention as respectively disclosed within FIGS. 2,3, 5-10 and FIGS. 12-14, resides in the fact that in lieu of the use of the manually rotated turnbuckle assembly comprising the elongated hexagonal nut member 34 in conjunction with the oppositely threaded rod members 30,32, the second embodiment apparatus 110 employs a fluid actuator 134 for use in connection with the oppositely threaded rod members 130, 132. The fluid actuator 134 may either be pneumatically or hydraulically actuated, and is therefore adapted to be fluidically connected to a remote source of pressurized pneumatic or hydraulic fluid by means of a suitable air or hydraulic fluid supply line or hose 140. The fluid supply line or hose 140 is connected to the cylindrical housing of the fluid actuator 134 by means of a suitable connector 142, and the fluid actuator may comprise, for example, a single piston-cylinder assembly, although a dual piston-cylinder assembly could of course be utilized. The oppositely threaded rod members 130,132 are simply inserted in a freely movable manner within the oppositely disposed ends of the fluid actuator 134, suitable seal assemblies, not illustrated, being housed internally within the fluid actuator 134 so as to fluidically seal the peripheral areas around the oppositely threaded rod members 130,132 disposed within the oppositely disposed ends of the fluid actuator 134. In addition, the single piston member, also not illustrated, disposed internally within the fluid actuator 134, is adapted to engage, for example, the end portion of the threaded rod member 130 which is disposed internally within the fluid actuator 134 so as to effectively move the threaded rod member 130, and the arcuately configured plate or shoe 122 fixedly attached thereto, relative to the other threaded rod member 132 whereby the fluid actuator 134, along with the threaded rod members 130,132 and the arcuately configured plates or shoes 122,124, effectively comprise a fluid jack assembly.

Figure 11:
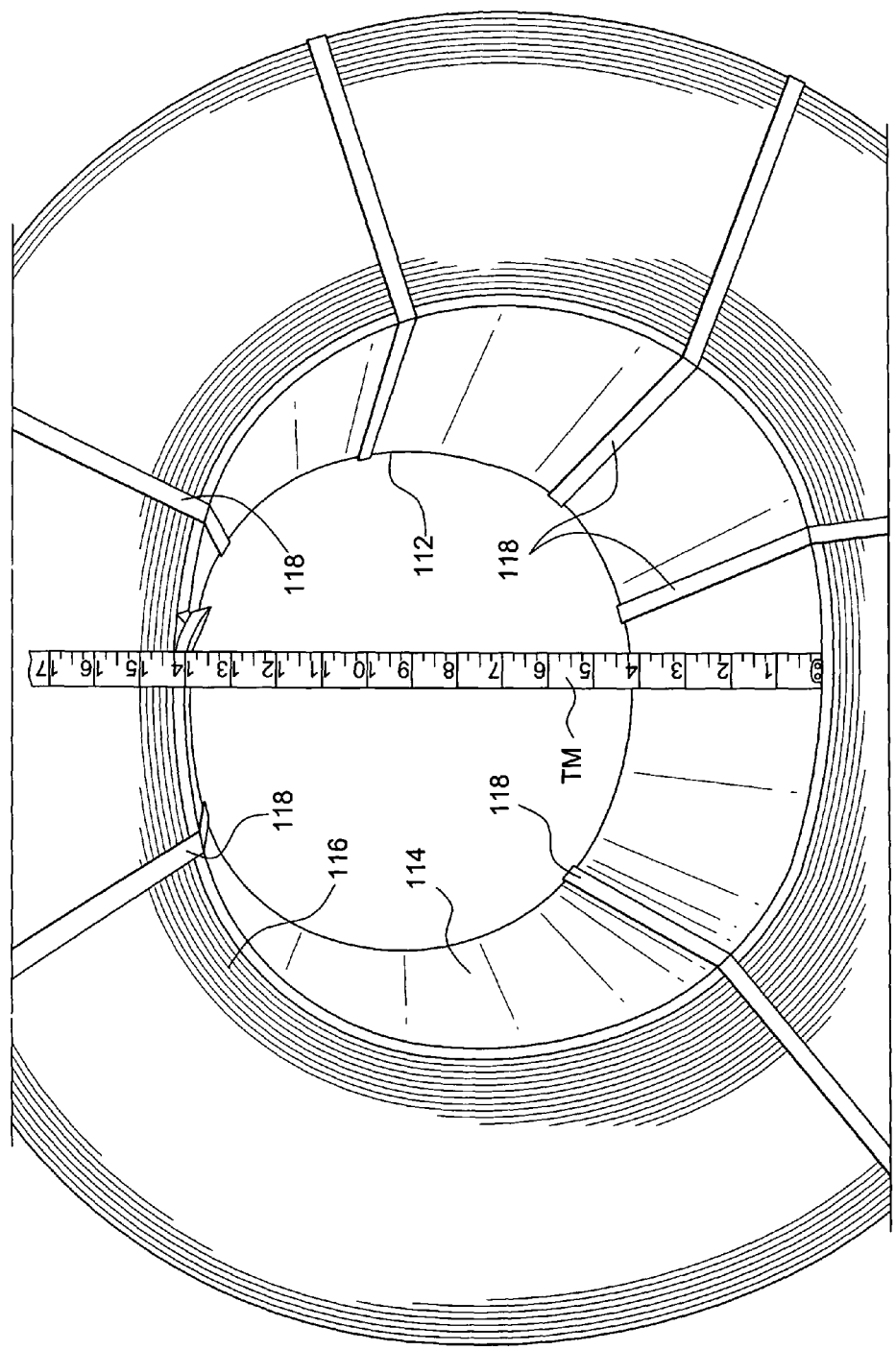
FIG. 11 is a perspective view, similar to that of FIG. 1 but showing, however, another deformed tubular core and coiled strapping material assembly, wherein it is seen that the inner diametrical extent of the deformed tubular core and coiled strapping material assembly, originally having, for example, a diametrical extent of sixteen inches (16.00"), has been deformed to such a degree that the inner diametrical extent of the deformed tubular core and coiled strapping material assembly is now only approximately fourteen inches (14.00")
Figure 12:
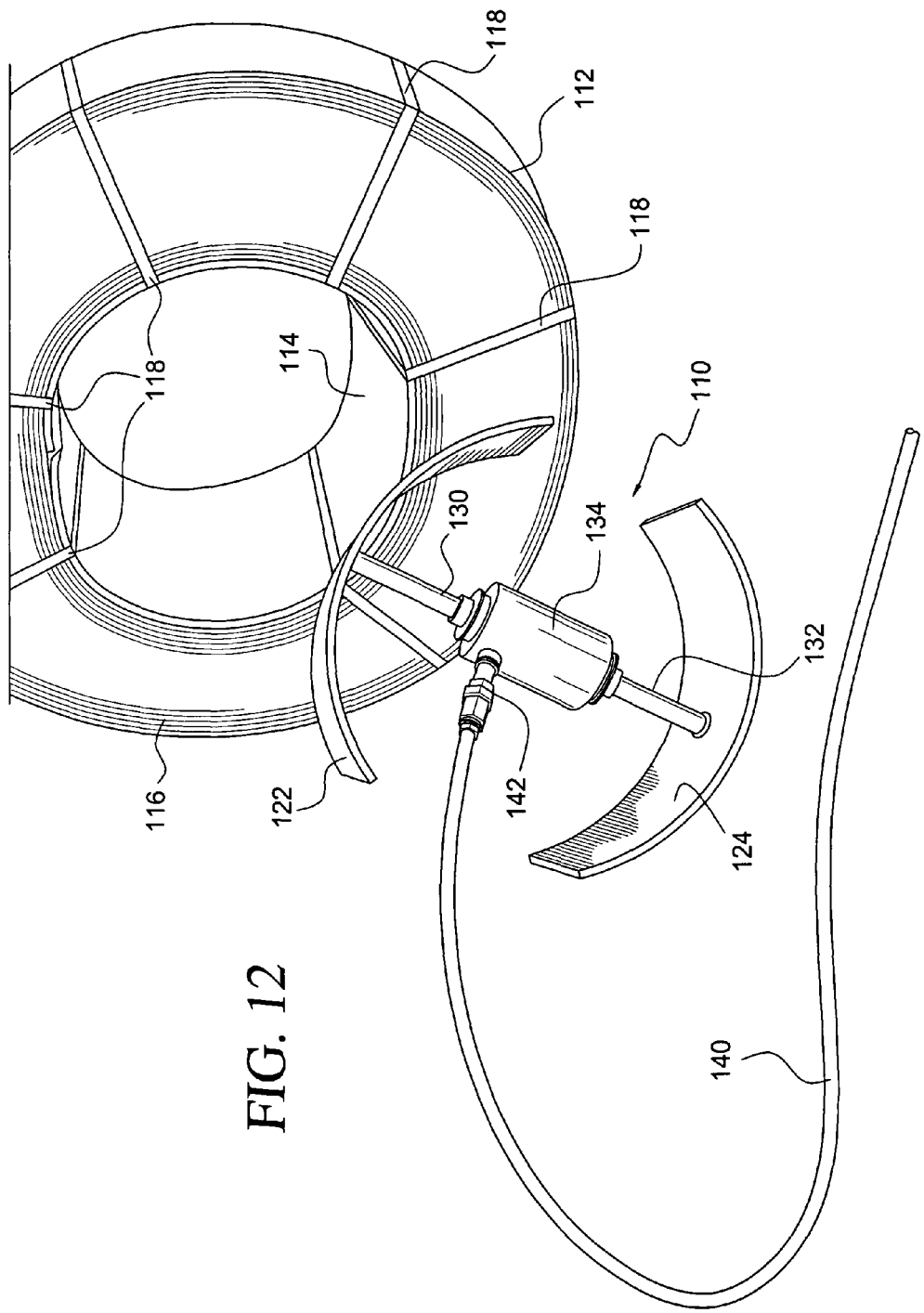
FIG. 12 is a perspective view of the deformed tubular core, and the deformed tubular core and coiled strapping material assembly, as disclosed within FIG. 11, and of a second embodiment extendible or expandable apparatus, also constructed in accordance with the principles and teachings of the present invention, for achieving the repair of the deformed tubular core, and the deformed tubular core and coiled strapping material assembly, when the second embodiment extendible or expandable apparatus is disposed internally within the deformed tubular core, and within the deformed tubular core and coiled strapping material assembly, so that when the second embodiment extendible or expandable apparatus is activated to its extended or expanded state, the deformed tubular core, and the deformed tubular core and coiled strapping material assembly, will be restored to their truly round or circular configurations.

Accordingly, when the new and improved second embodiment apparatus 110 is to be utilized in order to repair a damaged or deformed, out-of-round tubular core and coiled strapping material assembly 112 as disclosed, for example, within FIG. 11, wherein, for example, it is seen that the damaged or deformed, out-of-round tubular core and coiled strapping material assembly 112 has a relatively small vertically oriented or minor diametrical extent of fourteen inches (14.00"), as depicted by means of the tape measure TM, a suitable pressure relief mechanism, not shown, disposed upon the fluid actuator 134 will be actuated so as to effectively relieve the pressure internally acting upon the piston-cylinder mechanism of the fluid actuator 134 whereby, for example, the rod member 130 and its attached arcuately configured shoe or plate member 122 will be able to be moved to its CONTRACTED or RETRACTED position with respect to the oppositely disposed rod member 132 and its attached arcuately configured plate or shoe member 124 as disclosed, for example, within FIG. 12. Accordingly, the new and improved second embodiment apparatus 110 of the present invention is then able to, be disposed internally within the damaged or deformed core member 114 of the tubular core and coiled strapping material assembly 112 as disclosed within FIG. 13.

Figure 13:
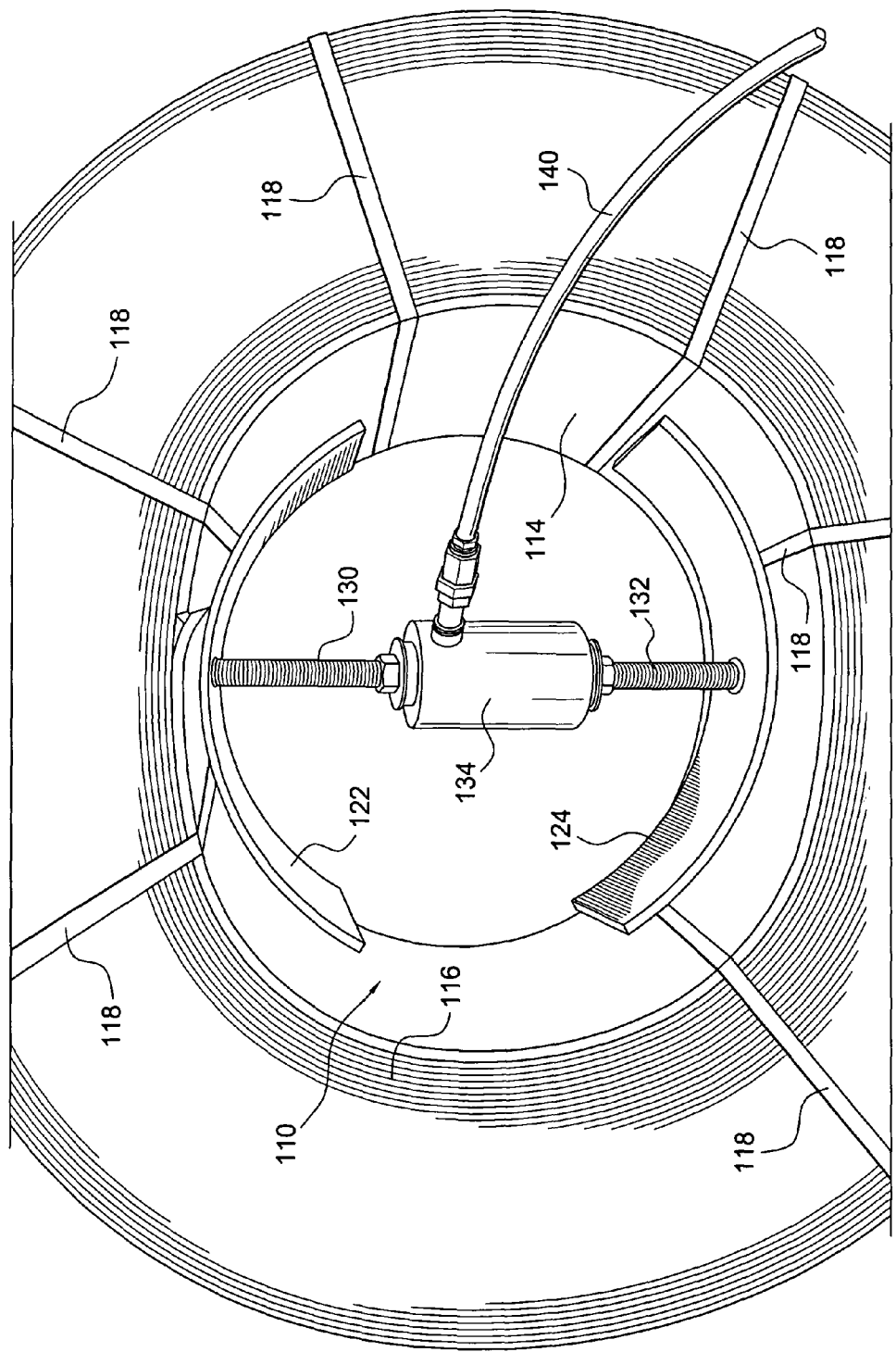
FIG. 13 is a perspective view showing the second embodiment extendible or expandable apparatus, as disclosed within FIG. 12, disposed internally within the deformed tubular core and coiled strapping material assembly and in its retracted or contracted state in preparation for being diametrically extended or expanded such that the diametrically opposed shoes can engage inner peripheral wall portions of the deformed tubular core and coiled strapping material assembly so as to effectively restore the configuration of the deformed tubular core, and the configuration of the deformed tubular core and coiled strapping material assembly, to a truly round or circular configuration.
Figure 14:
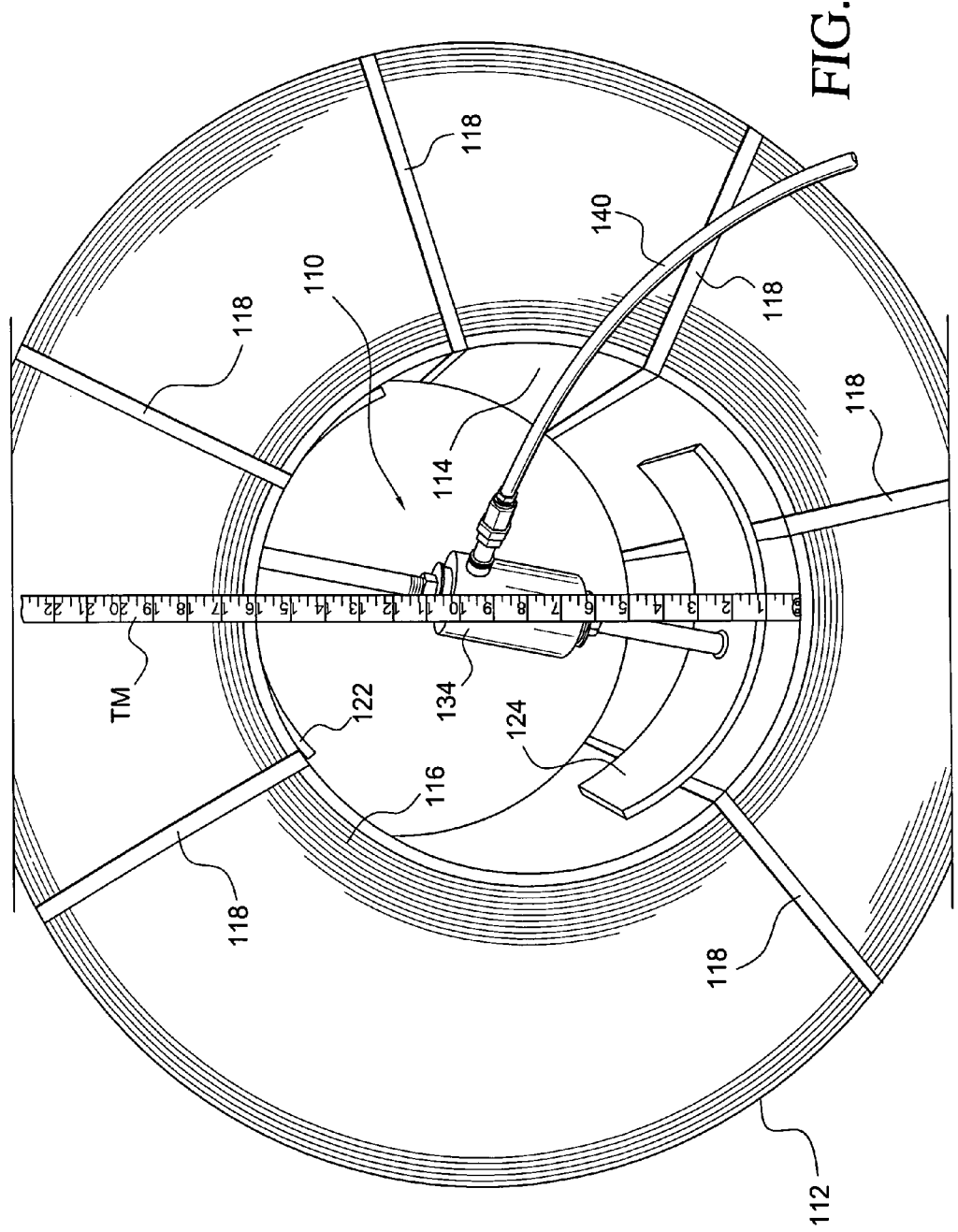
FIG. 14 is a perspective view, similar to that of FIG. 13, showing, however, the second embodiment extendible or expandable apparatus activated to its extended or expanded state wherein the pair of diametrically opposed shoes have engaged the internal peripheral wall portions of the deformed tubular core and coiled strapping material assembly and have forced the same radially outwardly such that the repaired tubular core and coiled strapping material assembly have regained their original round or circular configuration measuring, for example, sixteen inches (16.00").

Subsequently, with, for example, the arcuately configured plate or shoe member 124 disposed in contact with, and resting upon, an internal peripheral wall portion of the damaged or deformed core member 114 of the tubular core and coiled strapping material assembly 112 as disclosed within FIG. 13, the valve mechanism, not shown, disposed upon the fluid actuator 134 is actuated so as to permit pressurized fluid to be supplied into the fluid actuator 134 whereby the fluid will act upon the piston member operatively associated with the rod member 130 whereby the rod member 130, and the arcuately configured plate or shoe member 122 fixedly attached thereto, will be moved radially outwardly into forced engaged contact with, for example, an upper internal peripheral wall portion of the damaged or deformed core member 114 of the tubular core and coiled strapping material assembly 112. Continuing further, as the fluid pressure continues to be supplied into the fluid actuator 134, the pair of rod members 130,132 will effectively be moved further away from each other so as to, in turn, correspondingly move the pair of diametrically opposed, arcuately configured, upper and lower shoes or plates 122,124 still further away from each other until the pair of diametrically opposed, arcuately configured, upper and lower shoes or plates 122,124 are disposed at their fully EXTENDED positions, as illustrated within FIG. 14, such that the entire arcuate extents of the diametrically opposed, arcuately configured, upper and lower shoes or plates 122,124 are disposed in surface-to-surface contact with the inner peripheral portions of the core member 114 of the tubular core and coiled strapping material assembly 112 as disclosed within FIG. 14.

Accordingly, at this point in time, it can be appreciated that the tubular core member 114, and the tubular core and coiled strapping material assembly 112, have effectively been restored to their original round or circular configurations, wherein the internal diametrical extent of the tubular core member 114 is seen to be sixteen inches (16.00") as illustrated by means of the tape measure TM. Accordingly, the fluid relief valve mechanism, not shown, operatively associated with the fluid actuator 134, can again be actuated so as to effectively relieve the pressure within the fluid actuator 134 whereby the rod member 130, and the arcuately configured plate or shoe member 122 fixedly attached thereto, will be permitted to return to its RETRACTED position so as to permit the second embodiment apparatus 110 of the present invention to be removed from its position internally within the tubular core 114 of the tubular core and coiled strapping material assembly 112. The repaired or restored tubular core and coiled strapping material assembly 112 is then ready to be mounted upon, for example, the rotary structure or apparatus utilized for unwinding or dispensing the coiled strapping material 116.

Thus, it may be seen that in accordance with the principles and teachings of the present invention, there has been disclosed new and improved apparatus for repairing out-of-round cores, upon which strapping material has been coiled, when the core and coiled strapping assembly has been deformed and damaged and is therefore no longer capable of being mounted upon strapping unwinding and dispensing apparatus. The repair apparatus comprises a pair of diametrically opposed, substantially semi-circular plates or shoes which are mounted upon a pair of diametrically aligned rod members that are operatively connected together by means of a diametrically oriented expansion member. The apparatus is adapted to be disposed internally within the deformed core and coiled strapping assembly, and when the expansion member is diametrically extended, the pair of semi-circular shoes will be forced into contact with the inner periphery of the deformed core and coiled strapping assembly thereby returning the same to a truly round configuration. The apparatus is then removed from its position internally within the core and coiled strapping material assembly, whereby the repaired or restored core and coiled strapping material assembly is readied for mounting upon rotary unwinding or dispensing apparatus. Either mechanically or fluidically operated expansion members may be used, and while the core members have been described as comprising, for example, sixteen inch (16.00") diameter core members, the apparatus of the present invention can of course be utilized in conjunction with other or differently sized core members.

Obviously, many variations and modifications of the present invention are possible in light of the above teachings. It is therefore to be understood that within the scope of the appended claims, the present invention may be practiced otherwise than as specifically described herein.

What is claimed as new and desired to be protected by Letters Patent of the United States of America is:

1. Apparatus for repairing an out-of-round tubular member having a substantially circular closed loop configuration, comprising:
 a first arcuately configured member, having a predetermined radiused curvature, adapted to be disposed internally within a deformed, out-of-round tubular member having a substantially circular closed loop configuration so as to be disposed in contact with a first internal peripheral surface portion of the deformed, out-of-round tubular member;
 a second arcuately configured member, having a predetermined radiused curvature, adapted to be disposed internally within the deformed, out-of-round tubular member so as to be disposed in contact with a second internal peripheral surface portion of the deformed, out-of-round tubular member which is disposed substantially diametrically opposite the first internal peripheral surface portion of the deformed, out-of-round tubular member; and an extensible/contractible device interconnecting said first and second arcuately configured members together for alternatively moving said first and second arcuately configured members toward each other to relatively CONTRACTED positions so as to permit said first and second arcuately configured members to be disposed internally within the deformed, out-of-round tubular member, and for moving said first and second arcuately configured members away from each other to relatively EXTENDED positions so as to cause said first and second arcuately configured members to forcefully engage the first and second inner peripheral portions of the deform-ed, out-of-round tubular member in order to return the de-formed, out-of-round tubular member to a tubular member having a substantially true circular, closed loop round configuration.

2. The apparatus as set forth in claim 1, wherein:
each one of said first and second arcuately configured members comprises an arcuately configured plate.

3. The apparatus as set forth in claim 2, wherein:
each one of said first and second arcuately configured plates has a predetermined arcuate extent.

4. The apparatus as set forth in claim 3, wherein:
said predetermined arcuate extent of each one of said first and second arcuately configured plates has an arcuate extent of approximately 120°.

5. The apparatus as set forth in claim 1, further comprising:
a first externally threaded rod member fixedly connected to said first arcuately configured member;
a second externally threaded rod member fixedly connected to said second arcuately configured member; and
said extensible/contractible means interconnecting said first and second arcuately configured members together comprises an internally threaded nut member threadedly engaged upon end portions of said first and second externally threaded rod members.

6. The apparatus as set forth in claim 5, wherein:
said first externally threaded rod member has a right-hand thread formed thereon;
said second externally threaded rod member has a left-hand thread formed thereon; and
said nut member has right-hand and left-hand threads formed upon oppositely disposed internal end portions thereof for respectively threadedly mating with said right-hand and left-hand threaded portions of said first and second externally threaded rod members such that said first and second externally threaded rod members, and said nut member, together form a turnbuckle assembly.

7. The apparatus as set forth in claim 1, further comprising:
a first rod member fixedly connected to said first arcuately configured member;
a second rod member fixedly connected to said second arcuately configured member; and
said extensible/contractible means interconnecting said first and second arcuately configured members together comprises a fluid actuator for moving one of said first and second rod members, and one of said first and second arcuately configured members fixedly connected thereto, relative to the other one of said first and second rod members and the other one of said first and second arcuately configured members fixedly connected thereto.

8. The apparatus as set forth in claim 7, wherein:
said fluid actuator comprises a pneumatic fluid actuator.

9. The apparatus as set forth in claim 7, wherein:
said fluid actuator comprises a hydraulic fluid actuator.

10. Apparatus for repairing an out-of-round assembly comprising a tubular core member having a substantially circular closed loop configuration and material coiled thereon, comprising:
a first arcuately configured member, having a predetermined radiused curvature, adapted to be disposed internally within a deformed, out-of-round tubular core member having a substantially circular closed loop configuration so as to be disposed in contact with a first internal peripheral surface portion of the deformed, out-of-round tubular core member;
a second arcuately configured member, having a predetermined radiused curvature, adapted to be disposed internally within the deformed, out-of-round tubular core member so as to be disposed in contact with a second internal peripheral surface portion of the deformed, out-of-round tubular core member which is disposed substantially diametrically opposite the first internal peripheral surface; and
an extensible/contractible device interconnecting said first and second arcuately configured members together for alternatively moving said first and second arcuately configured members toward each other to relatively CONTRACTED positions so as to permit said first and second arcuately configured members to be disposed internally within the deformed, out-of-round tubular core member, and for moving said first and second arcuately configured members away from each other to relatively EXTENDED positions so as to cause said first and second arcuately configured members to forcefully engage the first and second inner peripheral portions of the deformed, out-of-round tubular core member in order to return the deformed, out-of-round tubular core member, and the material coiled thereon, to a tubular member having a substantially true circular, closed loop round configuration.

11. The apparatus as set forth in claim 10, wherein:
each one of said first and second arcuately configured members comprises an arcuately configured plate.

12. The apparatus as set forth in claim 11, wherein:
each one of said first and second arcuately configured plates has a predetermined arcuate extent.

13. The apparatus as set forth in claim 12, wherein:
said predetermined arcuate extent of each one of said first and second arcuately configured plates has an arcuate extent of approximately 120°.

14. The apparatus as set forth in claim 10, further comprising:
a first externally threaded rod member fixedly connected to said first arcuately configured member;
a second externally threaded rod member fixedly connected to said second arcuately configured member; and
said extensible/contractible means interconnecting said first and second arcuately configured members together comprises an internally threaded nut member threadedly engaged upon end portions of said first and second externally threaded rod members.

15. The apparatus as set forth in claim 14, wherein:
said first externally threaded rod member has a right-hand thread formed thereon;
said second externally threaded rod member has a left-hand thread formed thereon; and said nut member has right-hand and left-hand threads formed upon oppositely disposed internal end portions thereof for respectively threadedly mating with said right-hand and left-hand threaded portions of said first and second externally threaded rod members such that said first and second externally threaded rod members, and said nut member, together form a turnbuckle assembly.

16. The apparatus as set forth in claim 10, further comprising:
   a first rod member fixedly connected to said first arcuately configured member;
   a second rod member fixedly connected to said second arcuately configured member; and
   said extensible/contractible means interconnecting said first and second arcuately configured members together comprises a fluid actuator for moving one of said first and second rod members, and one of said first and second arcuately configured members fixedly connected thereto, relative to the other one of said first and second rod members and the other one of said first and second arcuately configured members fixedly connected thereto.

17. The apparatus as set forth in claim 16, wherein:
   said fluid actuator comprises a pneumatic fluid actuator.

18. The apparatus as set forth in claim 16, wherein:
   said fluid actuator comprises a hydraulic fluid actuator.

19. In combination, a deformed out-of-round tubular member having a substantially circular closed loop configuration, and apparatus for repairing the deformed out-of-round tubular member having the substantially circular closed loop configuration, comprising:
   a deformed out-of-round tubular member having a substantially circular closed loop configuration;
   a first arcuately configured member, having a predetermined radiused curvature, adapted to be disposed internally within said deformed, out-of-round tubular member so as to be disposed in contact with a first internal peripheral surface portion of said deformed, out-of-round tubular member;
   a second arcuately configured member, having a predetermined radiused curvature, adapted to be disposed internally within said deformed, out-of-round tubular member so as to be disposed in contact with a second internal peripheral surface portion of said deformed, out-of-round tubular member which is disposed substantially diametrically opposite the first internal peripheral surface portion of said deformed, out-of-round tubular member; and
   an extensible/contractible device interconnecting said first and second arcuately configured members together for alternatively moving said first and second arcuately configured members toward each other to relatively CONTRACTED positions so as to permit said first and second arcuately configured members to be disposed internally within said deformed, out-of-round tubular member, and for moving said first and second arcuately configured members away from each other to relatively EXTENDED positions so as to cause said first and second arcuately configured members to forcefully engage said first and second inner peripheral portions of said deformed, out-of-round tubular member in order to return said deformed, out-of-round tubular member to a tubular member having a substantially true circular, closed loop round configuration.

20. The combination as set forth in claim 19, further comprising:
   material coiled upon said deformed out-of-round tubular member.

* * * * *